United States Patent
Moorman et al.

(10) Patent No.: US 8,027,250 B2
(45) Date of Patent: Sep. 27, 2011

(54) CHANNEL INFORMATION DETECTOR, A METHOD OF DETECTING CHANNEL INFORMATION AND A COMMUNICATIONS NODE INCORPORATING THE DETECTOR OR METHOD

(75) Inventors: Jay R. Moorman, Sparta, NJ (US); Hui Yu, Piscataway, NJ (US)

(73) Assignee: Alcatel Lucent, Paris (FR)

( * ) Notice: Subject to any disclaimer, the term of this patent is extended or adjusted under 35 U.S.C. 154(b) by 1234 days.

(21) Appl. No.: 11/064,711

(22) Filed: Feb. 24, 2005

(65) Prior Publication Data

US 2006/0187929 A1 Aug. 24, 2006

(51) Int. Cl.
*H04J 1/16* (2006.01)
*H04J 3/14* (2006.01)

(52) U.S. Cl. ........ 370/229; 370/230; 370/231; 370/232; 370/235; 370/237

(58) Field of Classification Search .................. 370/329, 370/392, 248, 250, 397, 249, 395, 396, 398, 370/399, 400, 409, 410, 428, 241, 242, 252, 370/245; 455/450–466, 509; 371/20.1, 20.4, 371/20.5, 67.1
See application file for complete search history.

(56) References Cited

U.S. PATENT DOCUMENTS

| | | | | |
|---|---|---|---|---|
| 5,751,698 A * | 5/1998 | Cushman et al. | ............. | 370/252 |
| 6,781,966 B1 * | 8/2004 | Kim | .............................. | 370/311 |
| 6,834,059 B2 * | 12/2004 | Kibe | .............................. | 370/517 |
| 7,283,502 B1 * | 10/2007 | Abraham et al. | ............. | 370/337 |
| 2003/0100299 A1 * | 5/2003 | Ko et al. | ........................ | 455/423 |
| 2005/0143084 A1 * | 6/2005 | Cheng et al. | ............... | 455/452.2 |
| 2005/0260982 A1 * | 11/2005 | Ko et al. | ........................ | 455/423 |
| 2005/0276225 A1 * | 12/2005 | Mezer | .............................. | 370/241 |
| 2006/0120467 A1 * | 6/2006 | Miyoshi et al. | ............... | 375/260 |
| 2006/0209753 A1 * | 9/2006 | Patel | .............................. | 370/329 |

* cited by examiner

*Primary Examiner* — Kwang B Yao
*Assistant Examiner* — Adam Duda
(74) *Attorney, Agent, or Firm* — Hitt Gaines, PC

(57) ABSTRACT

A channel information detector, a method of detecting channel information and a communications node is provided for general communications networks. In one embodiment, the channel information detector includes (1) an information retriever configured to extract data unit parameters from a plurality of data units progressing through a protocol stack and (2) an information analyzer, coupled to the information retriever, configured to collectively analyze the data unit parameters to deduce channel information therefrom.

21 Claims, 5 Drawing Sheets

CHANNEL INFORMATION DETECTOR, A METHOD OF DETECTING CHANNEL INFORMATION AND A COMMUNICATIONS NODE INCORPORATING THE DETECTOR OR METHOD

GOVERNMENT CONTRACT

This invention was made with Government support. The Government has certain rights in this invention.

TECHNICAL FIELD OF THE INVENTION

The present invention is directed, in general, to communications networks, and more specifically, to a channel information detector, a method of detecting channel information and a communications node incorporating the detector or method.

BACKGROUND OF THE INVENTION

A communications network typically includes a variety of communication nodes coupled by wireless or wired connections and accessed through different types of communications channels. Each of the communications nodes includes a protocol stack that processes the data transmitted and received over the communications channels. Depending on the type of communications system, the operation and configuration of the various communication nodes can differ and are often referred to by different names. For example, in a Universal Mobile Telecommunications System (UMTS), the various communication nodes include a radio network controller (RNC), a base station (node-B) and a mobile device such as a cellular telephone. In addition, each interface between the communication nodes can be represented by a protocol stack such as the Iub interface protocol stack between the RNC and node-B within a UMTS system.

In order for the protocol stack to correctly process data received over a channel, certain information about the channel is required. Some information about the channel, such as, virtual path identification (VPI), virtual channel identification (VCI) and channel identification (CID), can be obtained directly from the received data. This information is often obtained from headers associated with the received data.

Other types of channel information needed by the protocol stack to process the received data cannot be so easily obtained. Thus, during installation, this pre-provisioned channel information is manually input to each communications node for each associated channel. Manually inputting this needed channel information is time consuming especially when there are multiple associated channels.

Additionally, the channel information has to be updated whenever there are changes to the communications node or channels associated therewith. The changes necessitating an update of the channel information can result from equipment replacement due to an upgrade, failure, etc., or the addition of communications nodes and channels as the communications network grows. Quickly updating channel information is especially desired when a communications node fails and a portion of the communications system is down. This can be even more frustrating when equipment from another manufacturer is used to replace the failed equipment.

Accordingly, what is needed in the art is a system and method that provides automatic update of channel information to an associated communications node. More specifically, what is needed is a system or method that allows an automatic and fast update of channel information needed by a protocol stack to process received data.

SUMMARY OF THE INVENTION

To address the above-discussed deficiencies of the prior art, the present invention provides a channel information detector, a method of detecting channel information and a communications node. In one embodiment, the channel information detector includes (1) an information retriever configured to extract data unit parameters from a plurality of data units progressing through a protocol stack and (2) an information analyzer, coupled to the information retriever, configured to collectively analyze the data unit parameters to deduce channel information therefrom.

Thus, the present invention provides a channel information detector that automatically determines needed channel information for the protocol stack from data progressing through the protocol stack. The needed channel information may be considered channel set-up information, such as, channel type, number of transport blocks (#TB) and number of bits in transport blocks (# Bits). Portions of the channel information determined by the channel information detector may be employed in a decision tree analysis with feedback to determine additional channel information and determine channel information that will be used for set-up. Accordingly, the present invention performs blind detection to extract channel information and avoid entering set-up information or querying nodes to force channels to be re-setup. Additionally, the present invention is not dependent on vendor equipment or platforms.

For purposes of the present invention, a communications node is defined as communications equipment that is configured to transmit and receive data over a wireless or wired medium. The communications node is accessed over a variety of channels and employs a protocol stack to process the received data. Communications node is used to generally refer to such equipment in various communications systems. For example, in the present invention a communications node applies to an RNC in a UMTS and also to a base station controller (BSC) in a Global System for Mobile Communications (GSM).

Additionally, a data unit is defined for purposes of the present invention as a general term referring to data that includes a payload and associated header information. In some communications systems, the data unit may be known as, for example, a packet or a frame.

In yet another embodiment, the present invention provides a method of detecting channel information for use with a receiver of a communications network including (1) extracting data unit parameters from a plurality of data units progressing through a protocol stack and (2) collectively analyzing the data unit parameters to deduce channel information therefrom.

In still another embodiment, the present invention provides a communications node including (1) a receiver configured to receive data units over channels, (2) a protocol stack configured to process the data units received over the channels and (3) a channel information detector. The channel information detector includes (3A) an information retriever configured to extract data unit parameters from a plurality of the data units progressing through the protocol stack and (3B) an information analyzer, coupled to the information retriever, configured to collectively analyze the data unit parameters to deduce channel information therefrom.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
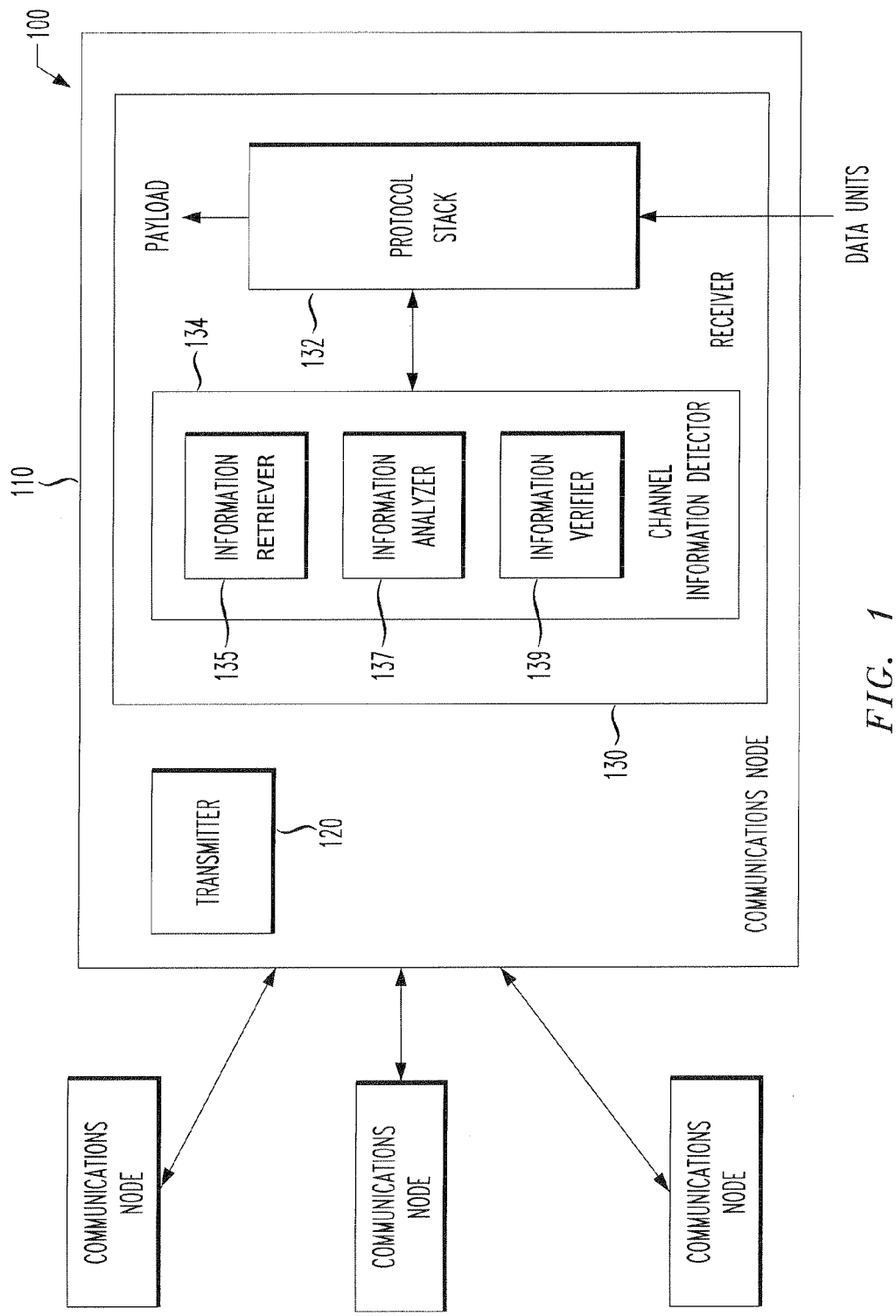
FIG. 1 illustrates a block diagram of one embodiment of a communications system including a communications node constructed according to the principles of the present invention.

Referring initially to FIG. 1, illustrated is a block diagram of one embodiment of a communications system, generally designated 100, including a communications node 110 constructed according to the principles of the present invention. The communications node 110 includes a transmitter 120 and a receiver 130. The receiver 130 includes a protocol stack 132 and a channel information detector 134. The channel information detector 134 includes an information retriever 135, an information analyzer 137 and an information verifier 139.

The communications system 100 may be a conventional communications system such as a UMTS having multiple communications nodes coupled through wireless or wired mediums. Of course, the communications system 100 may be another type of communications system, such as, GSM. For ease of discussion, the communications node 110 is representative of the other communications nodes that are illustrated. Accordingly, the illustrated detail and corresponding discussion of the communications node 110 may apply to each of the communications nodes. One skilled in the art will also understand that the communications node 110 includes additional components or systems that are not illustrated or discussed but are typically employed in a conventional communications node.

The communications node 110 may be an RNC of a UMTS configured to transmit, receive and process data units (packets). The receiver 130 receives the data units through the protocol stack 132 over various channels associated therewith. The received data units are processed (i.e., remove headers, error checking, etc.) as they move-up the protocol stack 132 such that payloads within the data units are provided to an application system at the top of the protocol stack 132. To properly process the received data units, the protocol stack 132 needs channel information over which the data units were received.

The protocol stack 132 may be a conventional protocol stack such as an Iub protocol stack employed in a UMTS. The channel information detector 134 may be implemented as a series of operating instructions, dedicated hardware or a combination thereof. As the received data units progress up the protocol stack 132, the channel information detector 134 determines and provides the needed channel information to the protocol stack 132. Typically, the channel information that is needed includes the channel type, the number of transport blocks and the number of bits in the transport blocks. To determine the channel information, the information retriever 135 is configured to extract data unit parameters from a plurality of the received data units progressing up the protocol stack 132. The information analyzer 137, coupled to the information retriever 135, is configured to collectively analyze the data unit parameters to deduce the channel information therefrom. The information verifier 139 is configured to verify the channel information before the channel information is used by the protocol stack 132 to set-up for the receiving channel and complete processing of the received packets.

The information verifier 139 may provide verification for different channel information at different points associated with the protocol stack 132. In one embodiment, the information verifier 139 is associated with higher layers of the protocol stack 132. For example considering an Iub protocol stack, the information verifier 139 is located at the Radio Resource Control (RRC) layer. In addition to verifying the channel information, the information verifier 139 can provide feedback to the information analyzer 137 to employ for subsequent analyzing. Thus, the channel information detector 134 is a self-adapting system. The feedback can also be provided at different points associated with the protocol stack 132.

The information analyzer 137 is configured to deduce the needed channel information based on a distribution of the data unit parameters. The information analyzer 137 may employ a number of strategies to analyze the distribution of the data unit parameters. For example, the information analyzer 137 may individually or collectively employ strategies such as a window analysis, a statistical model or a relational analysis. Additionally, the information analyzer 137 is configured to deduce the channel information based on rules associated with the data unit parameters. Each of these strategies will be discussed in more detail with respect to FIG. 2.

Figure 2:
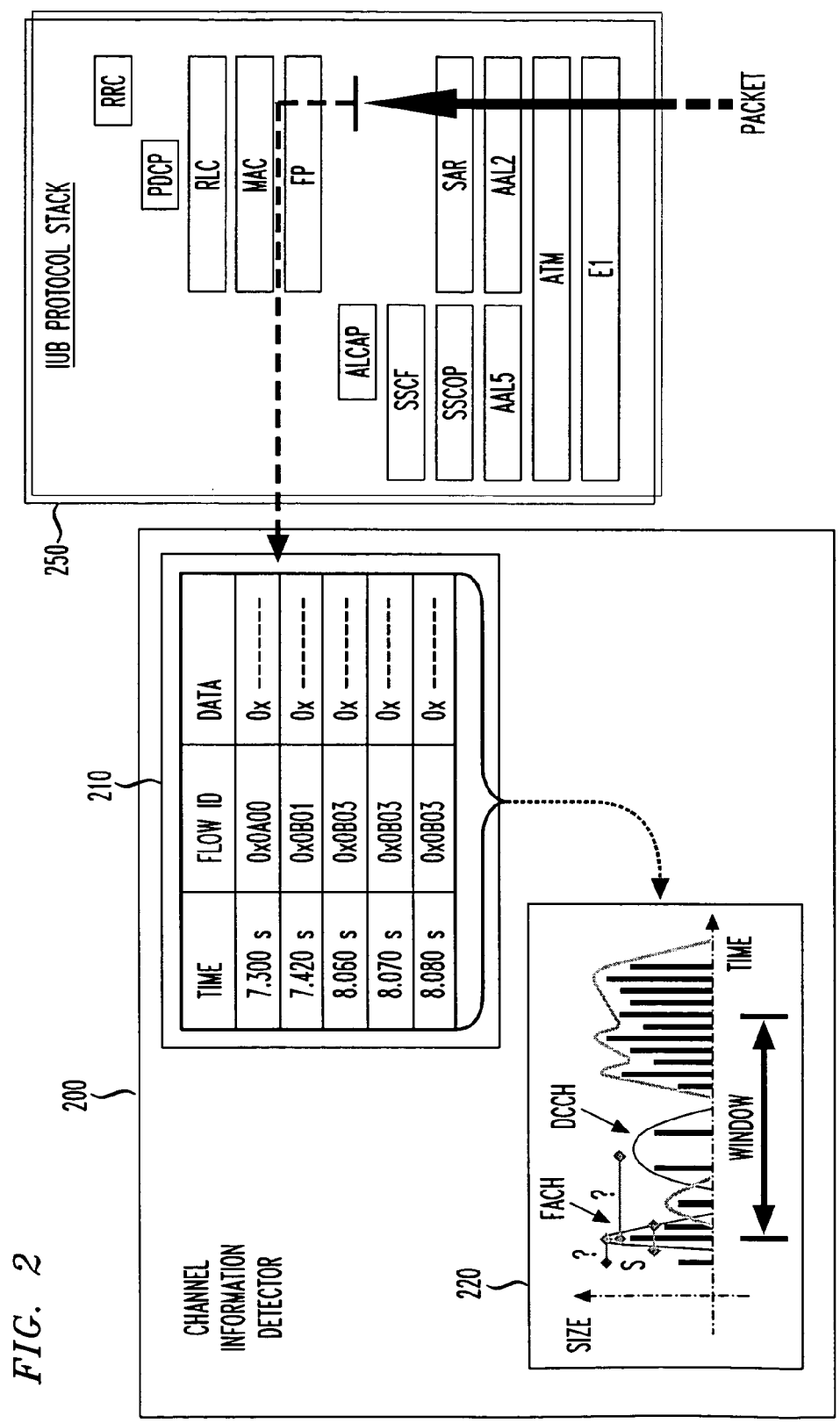
FIG. 2 illustrates a block diagram of one embodiment of a channel information detector with respect to an associated protocol stack constructed according to the principles of the present invention.

Turning now to FIG. 2, illustrated is a block diagram of one embodiment of a channel information detector, generally designated 200, with respect to an associated protocol stack 250, constructed according to the principles of the present invention. The channel information detector 200 is configured to determine channel information according to the principles of the present invention. The channel information detector 200 includes an information retriever 210 and an information analyzer 220. The protocol stack 250 is an Iub protocol stack that processes data units (packets) in a UMTS.

The information retriever 210 is configured to extract packet parameters from a plurality of packets moving up the protocol stack 250. In FIG. 2, the information retriever 210 extracts packet information at the frame protocol (FP) layer of the protocol stack 250 and generates a table of the packet information to represent raw data of a flow of the received packets. A packet flow is defined for the purpose of the present invention as a collection of packets moving up layers of the protocol stack 250 that have a separation between another collection of packets moving up the protocol stack 250. To generate the packet parameters for a packet flow, the information retriever 210 may partially decode the packets at the FP layer.

The information analyzer 220 is configured to collectively analyze the extracted packet parameters and deduce channel information therefrom. To represent the analysis performed by the information analyzer 220, a graph is illustrated. The information analyzer 220 may generate the graph based on the extracted packet parameters. The information analyzer 220 may employ a variety of analysis strategies individually or collectively to deduce the channel information from the packet parameters. Window analysis strategy is one such analysis strategy.

The window analysis strategy designates a specific amount of time to analyze the packet parameters. Various window sizes may be employed and multiple window sizes may be used together when analyzing. Different rules for analyzing the packet parameters may be employed depending on the window size selected.

The information analyzer 220 may also employ a statistical model strategy to analyze the packet parameters. Statistics may be developed based on size, variance ($\sigma^2$) and mean ($\Sigma xi/n$). Statistics may be developed for individual flows of packets and for packets within a specific flow. These statistics may be compared to known characteristics and may be used for subsequent analysis of packet flows.

The information analyzer 220 may also employ a relational analysis strategy to determine channel information from the packet parameters. In this strategy, packet flows may be compared to other packet flows to determine the channel information. For example, the information analyzer 220 can look at envelopes of the packet flows and determine what precedes or follows a specific envelope.

Additionally, the information analyzer 220 may employ a rule-based strategy to determine the channel information. Based on the packet parameters, known rules may be used to determine the channel information. Additionally, the information analyzer 220 may develop rules based on feedback and history. In some embodiments, the information analyzer 220 may recognize a correlation between received packets and a previously identified channel.

The rule-based strategy can be used in conjunction with other analysis strategies such as the relational analysis strategy. For example, a fundamental rule that may be employed in a UMTS is that a Random Access Channel (RACH) precedes a Forward Access Channel (FACH) that precedes a Dedicated Control Channel (DCCH). Thus, the information analyzer 220 may analyze the envelopes of received packets and determine that one packet flow is over a RACH and that the next subsequent packet flow is over a FACH. In addition to combining the relational analysis strategy and the rule-based strategy, one skilled in the art will understand that additional strategies may be employed and combined by the information analyzer 220.

The information analyzer 220 may include a channel information table to maintain information obtained from feedback, known rules or generated rules. Once the channel type is determined, the information analyzer 220 can employ this information to determine the number of transport blocks and the number of bits in the transport blocks. This will be discussed in more detail with respect to FIG. 3.

Figure 3:
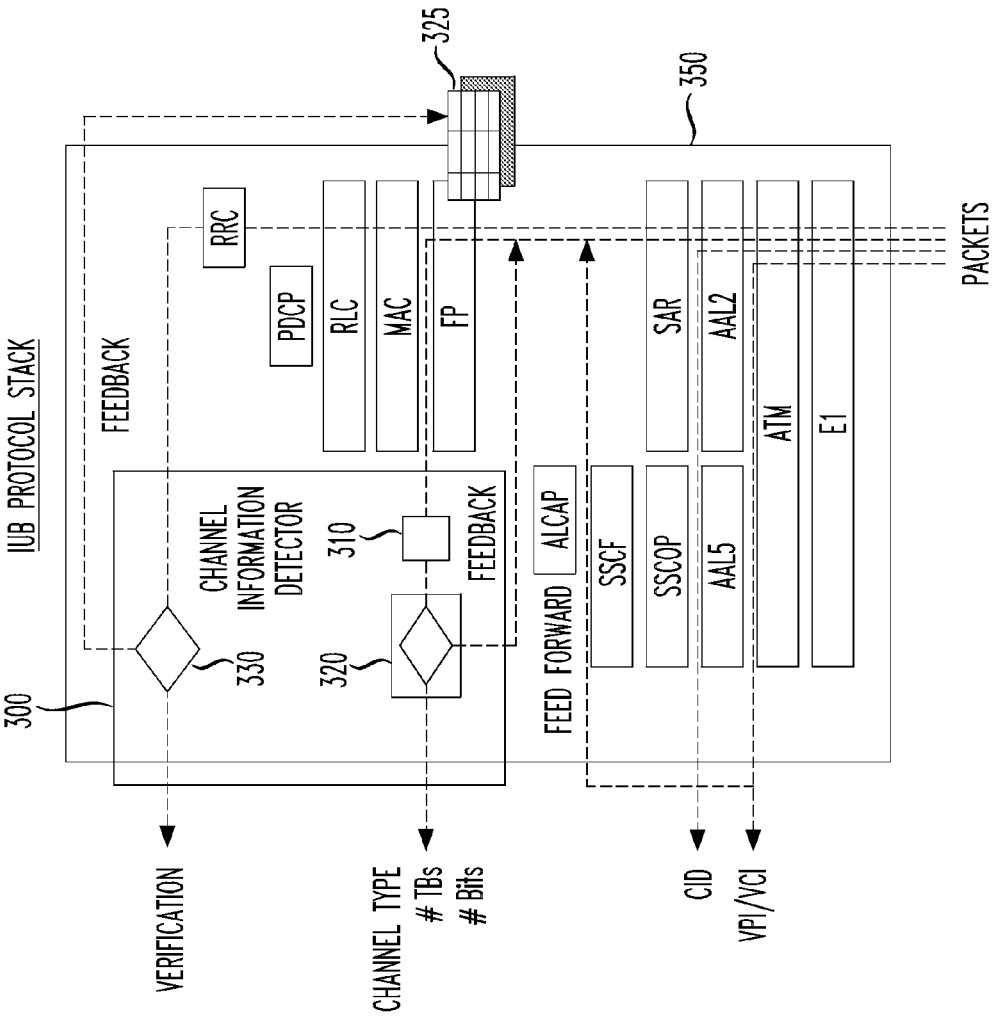
FIG. 3 illustrates a block diagram of another embodiment of a channel information detector with respect to a protocol stack constructed according to the principles of the present invention.
Figure 4:
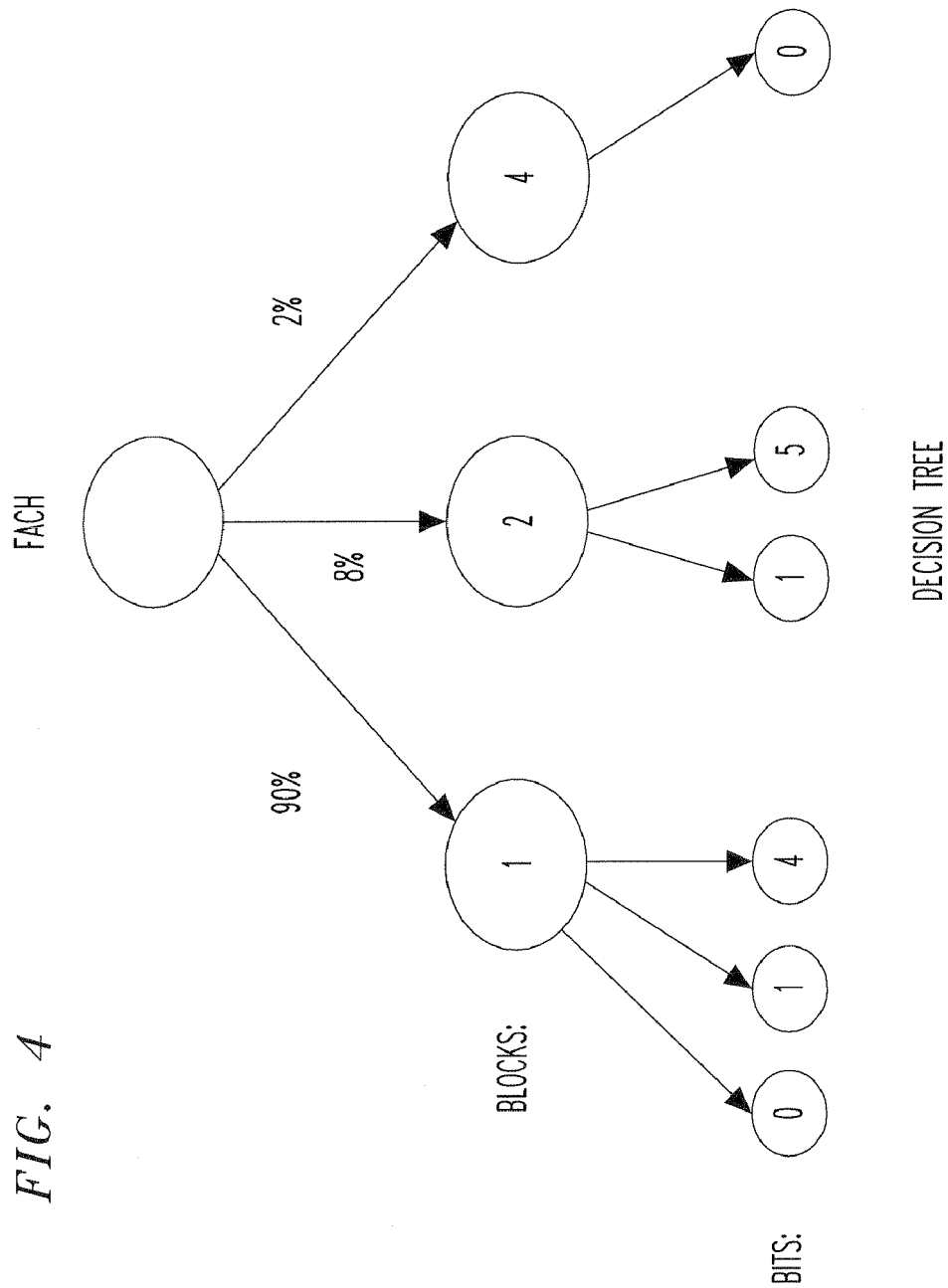
FIG. 4 illustrates a decision tree employed in an embodiment of an information analyzer constructed according to the principles of the present invention.

Turning now to FIG. 3, illustrated is a block diagram of an embodiment of a channel information detector, generally designated 300, configured according to the principles of the present invention and illustrated with respect to an Iub protocol stack 350. The channel information detector 300 includes an information retriever 310, an information analyzer 320 and an information verifier 330. The information analyzer 320 includes a channel information table 325. A portion of the channel information table 325, including columns for channel type, initial state and history, is represented below as Table 1. Additionally, a decision tree is illustrated in FIG. 4 to represent the analysis employed to determine the number of transport blocks and the number of bits in the transport blocks. The decision tree corresponds with the representative portion of the channel information table 325 in Table 1.

TABLE 1

| CHANNEL TYPE | INITIAL STATE | HISTORY |
|---|---|---|
| FACH | 1 | 90% (44) |
|  | 2 | 8% (4) |
|  | 4 | 2% (1) |
| RACH | 1 | — |
|  | 2 | — |

The information retriever 310 may be configured to extract packet parameters as discussed with respect to the information retriever 210 of FIG. 2. Additionally, the information analyzer 320 may be configured to determine a channel type as discussed with respect to the information analyzer 220 of FIG. 2.

The information analyzer 320 is also configured to employ the channel type to determine the number of transport blocks and the number of bits in the transport blocks. The information analyzer 320 compares the determined channel type with the channel information table 325. From the channel information table 325, an initial state (educated guess) is selected to determine the number of transport blocks. The initial state may be based on assumptions (i.e., common channels employ one transport block), common set-up (i.e., specifications associated with a communications system) and training. A history of previous successful determinations of the number of blocks may be maintained in the channel information table 325.

The selected initial state is used to select a branch of the decision tree in FIG. 4 representing the number of transport blocks wherein subsequent branches representing the number of bits in the transport blocks are selected based on a high probability. Due to padding, the number of bits in each transport block needs to be determined. Knowing a field length, the number of transport blocks and that an octet size is achieved by padding (range of bits for padding is from zero to seven), the number of bits in the transport blocks can be determined.

If a successful result is not obtained by traversing existing branches of the decision tree in FIG. 4, another branch is added to the decision tree and reflected in the channel information table 325. Once a channel type, the number of transport blocks and the number of bits in the transport blocks is determined, this information is sent up the protocol stack 350 to the information verifier 330 for verification. If the information verifier 330 verifies the channel information, then the channel information is used to set-up the protocol stack 350 for processing. Otherwise, the channel information detector 300 will have to determine the channel information again. Regardless of the result of verification, the information verifier 330 provides feedback to the channel information table 325 for subsequent analysis.

Figure 5:
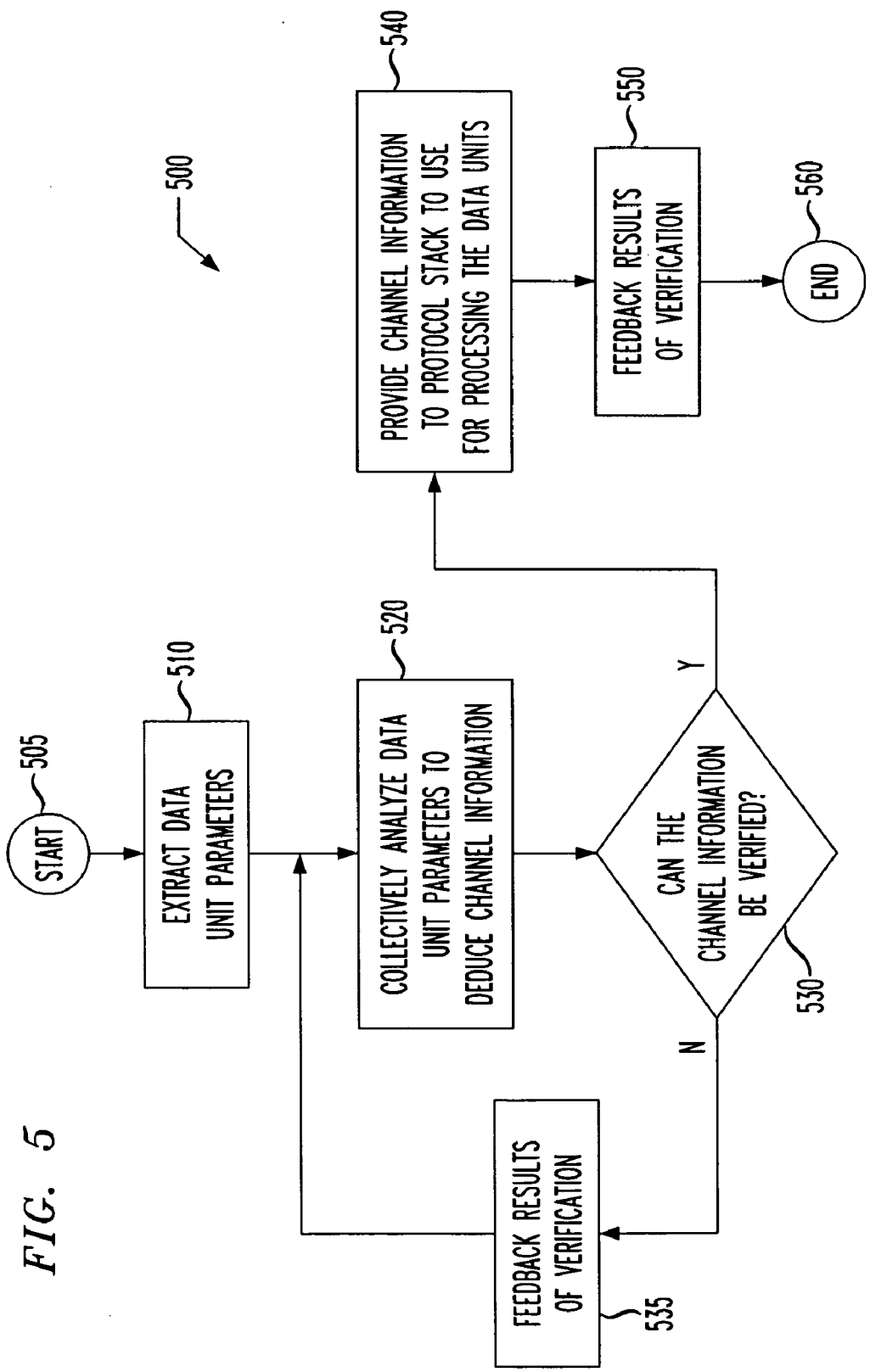
FIG. 5 illustrates a flow diagram of an embodiment of a method of detecting channel information carried out according to the principles of the present invention.

Turning now to FIG. 5, illustrated is a flow diagram of an embodiment of a method of detecting channel information, generally designated 500, carried out according to the principles of the present invention. The method 500 begins in a step 505 with a desire to determine channel information.

After starting, data unit parameters from a plurality of data units progressing through a protocol stack are extracted in a step 510. An information retriever may be employed to extract the data unit parameters.

After extracting, the data unit parameters are collectively analyzed to deduce channel information therefrom in a step 520. The data unit parameters may be collectively analyzed to deduce the channel information based on a distribution of the data unit parameters. Analysis strategies such as a window analysis, a statistical model or a relational analysis may be employed separately or collectively. Additionally, the channel information may be deduced employing rules associated with the data unit parameters. These may be rules based on a communications system. Additionally, these rules may be generated from previous analyzing and employed for subsequent analysis.

After analyzing, the deduced channel information is verified in a decisional step 530. If the deduced channel information is verified, the deduced channel information is provided to the protocol stack to employ for additional processing of the data units in a step 540. Additionally, results of the verifying are provided for subsequent analyzing in a step 550. After providing the results, the method 500 ends in a step 560.

Returning now to the decisional step 530, if the channel information is not verified, the verification results are provided for subsequent analyzing in a step 535. After providing the verification results, the method 500 continues to step 520 for further analyzing.

Although the present invention has been described in detail, those skilled in the art should understand that they can make various changes, substitutions and alterations herein without departing from the spirit and scope of the invention in its broadest form.

What is claimed is:

1. A channel information detector for use with a receiver in a communications network, comprising:
   an information retriever configured to extract data unit parameters from a plurality of data units progressing through a protocol stack of said receiver; and
   an information analyzer, coupled to said information retriever, configured to collectively analyze said data unit parameters to deduce channel information from said plurality of data units progressing through said protocol stack, wherein said information analyzer is configured to return said deduced channel information to said receiver on which said protocol stack is implemented, and wherein said receiver on which said protocol stack is implemented is configured to use said deduced channel information for further processing, by said protocol stack, of said plurality of data units progressing through said protocol stack.

2. The channel information detector as recited in claim 1 further comprising an information verifier configured to verify said channel information.

3. The channel information detector as recited in claim 2 wherein said information verifier provides feedback to said information analyzer.

4. The channel information detector as recited in claim 1 wherein said channel information is selected from the group consisting of:
   channel type,
   number of transport blocks, and
   number of bits in transport blocks.

5. The channel information detector as recited in claim 1 wherein said information analyzer is configured to deduce said channel information based on a distribution of said data unit parameters.

6. The channel information detector as recited in claim 5 wherein said information analyzer is configured to deduce said channel information employing an analysis strategy selected from the group consisting of:
   a window analysis,
   a statistical model, and
   a relational analysis.

7. The channel information detector as recited in claim 1 wherein said information analyzer is configured to deduce said channel information based on rules associated with said data unit parameters.

8. A method of detecting channel information for use with a receiver of a communications network, comprising:
   extracting data unit parameters from a plurality of data units progressing through a protocol stack of said receiver;
   collectively analyzing said data unit parameters to deduce channel information not directly obtainable from said plurality of data units progressing through said protocol stack; and
   providing said deduced channel information to said receiver on which said protocol stack is implemented, wherein said receiver on which said protocol stack is implemented uses said deduced channel information for further processing, by said protocol stack, of said plurality of data units progressing through said protocol stack.

9. The method as recited in claim 8 further comprising verifying said channel information.

10. The method as recited in claim 9 further comprising providing feedback subsequent to analyzing.

11. The method as recited in claim 8 wherein said channel information is selected from the group consisting of:
    channel type,
    number of transport blocks, and
    number of bits in transport blocks.

12. The method as recited in claim 8 wherein said collectively analyzing includes deducing said channel information based on a distribution of said data unit parameters.

13. The method as recited in claim 12 wherein said deducing includes employing an analysis strategy selected from the group consisting of:
    a window analysis,
    a statistical model, and
    a relational analysis.

14. The method as recited in claim 8 wherein said collectively analyzing includes deducing said channel information based on rules associated with said data unit parameters.

15. A communications node, comprising:
    a receiver configured to receive data units over channels;
    said receiver including:
       a protocol stack configured to process said data units received over said channels; and
       a channel information detector, including:
          an information retriever configured to extract data unit parameters from a plurality of said data units progressing through said protocol stack of said receiver; and
          an information analyzer, coupled to said information retriever, configured to collectively analyze said data unit parameters to deduce channel information from said plurality of said data units progressing through said protocol stack, wherein said information analyzer is configured to return said deduced channel information is to said receiver on which said protocol stack is implemented, and wherein said receiver on which said protocol stack is implemented is configured to use said deduced channel information for further processing, by said protocol stack, of said plurality of data units progressing through said protocol stack.

16. The communications node as recited in claim 15 further comprising an information verifier configured to verify said channel information.

17. The communications node as recited in claim 16 wherein said information verifier provides feedback to said information analyzer.

18. The communications node as recited in claim 15 wherein said channel information is selected from the group consisting of:
   channel type,
   number of transport blocks, and
   number of bits in transport blocks.

19. The communications node as recited in claim 15 wherein said communications node is a radio network controller (RNC) in a Universal Mobile Telecommunications System (UMTS).

20. The communications node as recited in claim 15 wherein said information analyzer is configured to deduce said channel information based on a distribution of said data unit parameters employing an analysis strategy selected from the group consisting of:
   a window analysis,
   a statistical model, and
   a relational analysis.

21. The communications node as recited in claim 15 wherein said information analyzer is configured to deduce said channel information based on rules associated with said data unit parameters.

* * * * *